United States Patent
Hsu et al.

(10) Patent No.: US 7,833,622 B2
(45) Date of Patent: *Nov. 16, 2010

(54) OPTICAL FILM

(75) Inventors: Lung-Lin Hsu, Kaohsiung (TW);
Shu-Hong Liu, Kaohsiung (TW);
Yi-Chia Wang, Kaohsiung (TW)

(73) Assignee: Eternal Chemical Co., Ltd., Taiwan (CN)

( * ) Notice: Subject to any disclaimer, the term of this patent is extended or adjusted under 35 U.S.C. 154(b) by 48 days.

This patent is subject to a terminal disclaimer.

(21) Appl. No.: 12/157,747

(22) Filed: Jun. 12, 2008

(65) Prior Publication Data

US 2008/0311352 A1    Dec. 18, 2008

(30) Foreign Application Priority Data

Jun. 12, 2007   (TW) ............................... 96121299 A

(51) Int. Cl.
*B32B 5/16* (2006.01)

(52) U.S. Cl. ........................ 428/327; 428/174; 428/412; 428/423.7; 428/473.5; 428/480

(58) Field of Classification Search ................. 428/327, 428/174, 412, 423.1, 473.5, 480
See application file for complete search history.

(56) References Cited

U.S. PATENT DOCUMENTS

2008/0305301 A1 * 12/2008 Hsu et al. ................... 428/147

* cited by examiner

*Primary Examiner*—Gwendolyn Blackwell
(74) *Attorney, Agent, or Firm*—Ladas & Parry

(57) ABSTRACT

The subject invention provides an optical film, comprising a transparent substrate and a resin coating having a convex-concave structure on at least one surface of the substrate, wherein said resin coating comprises a plurality of organic particles and a binder, the organic particles being formed from a polyacrylate resin which comprises at least one acrylate monomer type having multiple functional groups as polymerization units, said multi-functional acrylate monomers being in an amount from 30 to 70 wt % based on the total weight of the monomers, and wherein the organic particles have a mean particle size, the particle size distribution of the organic particles ranging within about ±5% of the mean particle size, and wherein the organic particles are in an amount from about 180 to 320 parts by weight per 100 parts by weight of the solid contents of the binder.

37 Claims, 8 Drawing Sheets

OPTICAL FILM

BACKGROUND OF THE INVENTION

1. Field of the Invention

The present invention relates to an optical film. In particular, the present invention relates to a diffusion film applicable to a backlight module for liquid crystal displays.

2. Description of the Prior Art

Liquid crystal panels are being substituted for cathode-ray tubes and become a main stream in the market because of the merits of high definition, low irradiation, low power consumption and better utilization of space. Since liquid crystal panels cannot emit light, it is necessary to use a backlight module as a light source to offer distributed light, so that the display device can display images normally and can obtain sufficient luminance and contrast.

The main elements consisting of a backlight module include incident light, a reflective film, a light guide plate, a diffusion plate, a diffusion film, brightness enhancement film and a prism protective film and so on. The main function of the diffusion plate and diffusion film is to provide liquid crystal displays with a uniform surface light. Normally, the diffusion plate and diffusion film include two types, i.e., the inner-diffusion type and the surface-diffusion type. The inner-diffusion type is consisting of polycarbonate (PC), polystyrene or polymethyl methacrylate (PMMA) resins with organic or inorganic particles. By the utilization of diffusion particles, the light will be refracted and scattered because it passed through two media with different refractive indexes, so that the linear light emitted from the light source can be diffused into a uniform surface light. That is, the light from a below light source is scattered by the diffusion plate, uniformly dispersed upward, and then emitted. The surface-diffusion type reflects and refracts light by roughening the surface of a transparent resin plate. However, the surface-diffusion type is time-consuming and complicated in preparation procedure and is relative expensive in cost.

It is known that particles with different particle sizes can be used as diffusion particles so as to enhance the light diffusion effect. For a conventional diffusion film, a resin coating containing a plurality of diffusion particles with different particle sizes is formed on a substrate. The diffusion particles normally have a particle size in the range of 1 μm to 50 μm. The diffusion particles used in the prior art have a wide particle size distribution. That is, the particle size distribution of the diffusion particles in the resin coating (y represents the quantity of particles, while x represents the particle size) is a wide single-peak distribution. For example, when the particles used have a mean particle size of about 15 μm, the particle size distribution of the particles generally ranges from about 1 μm to about 30 μm. It is also known in the art that a mixture of more than two groups of particles with different mean particle sizes can be used as diffusion particles. That is, the particle size distribution of the diffusion particles (y represents the quantity of particles, while x represents the particle size) is a two (multi)-peak distribution. Although the light diffusion effect can be improved by using diffusion particles having a wide single-peak particle size distribution or a two (multi)-peak particle size distribution, the light will be scattered randomly due to the different particle sizes of the particles, and as a result, the light source cannot be efficiently utilized.

It is known that, if the diffusion particles in the coating are aggregated or adhered to each other, not only is the light diffusion uniformity affected, but dark spots are also likely to be generated on the surface of the display. In order to solve the above problems, U.S. Pat. No. 7,218,450 B2 discloses using one or more organic or inorganic particles with a single distribution as diffusion particles with certain parameters, including the lamination ratio, particle size of the flocculated particles, and when two kinds of particles with a single distribution are used, the mean particle sizes of the two kinds of particles with a single distribution, that meet special formulae. 95% of the particles with a single distribution used in U.S. Pat. No. 7,218,450 B2 have a particle size ranging within ±15% of the mean particle size. U.S. Pat. No. 7,218,450 B2 further teaches using diffusion particles having a narrow particle size distribution, but is silent on the crosslinking degree of the diffusion particles. In fact, an insufficient crosslinking degree of the diffusion particles will inevitably cause some problems. For example, particles with a low crosslinking degree are likely to interact with the solvent in the binder and thus swell up. Therefore, compared with the particles with a high crosslinking degree, the particles with a low crosslinking degree will have a low solvent resistance. Furthermore, as the volume of the particles with a low crosslinking degree is changed because the solvent is absorbed, the optical properties of the particles become unstable, and the viscosity on the surfaces of the particles increases, so that the particles are easily aggregated with each other, thereby further affecting the coating processibility and light diffusion effects of the diffusion film.

In addition, in various optical films, the brightness enhancement film is relatively expensive, so in the newly developed backlight module structures, modifications were made to the other optical films and the combinations thereof so as to substitute for the brightness enhancement film and to reduce the cost. For example, in liquid crystal displays, two or three diffusion films were used to replace the conventional design of the brightness enhancement film with two diffusion films respectively located on and below the brightness enhancement film. Nevertheless, the luminance and the other performances are inferior compared with the conventional design. Therefore, for current techniques, the design of the diffusion film not only focuses on meeting the light diffusion efficiency requirement, but the means of improving the luminance of the diffusion film also needs to be considered.

SUMMARY OF THE INVENTION

The present invention provides an optical film having high luminance.

The present invention also provides an optical film capable of uniformly diffusing light. By modifying the particle size distribution of organic particles and the proportion of binders, the diffusing effect of the optical film of the present invention can be optimized.

The present invention further provides an optical film containing highly crosslinked organic particles that are solvent resistant and can prevent the organic particles from swelling up, resulting in the unstability of the optical properties of the film. Meanwhile, by increasing the crosslinking degree of the organic particles, the hardness of the organic particles is enhanced, so as to enhance their scratch resistance and wear resistance.

The present invention further provides multiple optical films so as to achieve the enhancement of luminance.

In order to achieve the above objectives, the present invention provides an optical film comprising a transparent substrate and a resin coating having a convex-concave structure on one surface of the transparent substrate, the resin coating including a plurality of organic particles and a binder. The organic particles are polyacrylate resin particles, wherein the polyacrylate resin comprises at least one mono-functional acrylate monomer and at least one multi-functional acrylate monomer as polymerization units, and the multi-functional acrylate monomers are in an amount from about 30 wt % to 70 wt % based on the total weight of the monomers; the organic particles have a single mean particle size; the particle size distribution of the organic particles ranges within about ±5% of the mean particle size; and the organic particles are in an amount from about 180 to about 320 parts by weight per 100 parts by weight of the solids content of the binder.

DETAILED DESCRIPTION OF THE INVENTION

The optical film of the present invention is illustrated below in detail by the embodiments with reference to the drawings, which are not intended to limit the scope of the present invention. It will be apparent that any modifications or alterations that can easily be accomplished by those having ordinary skill in the art fall within the scope of the disclosure of the specification.

Figure 1:
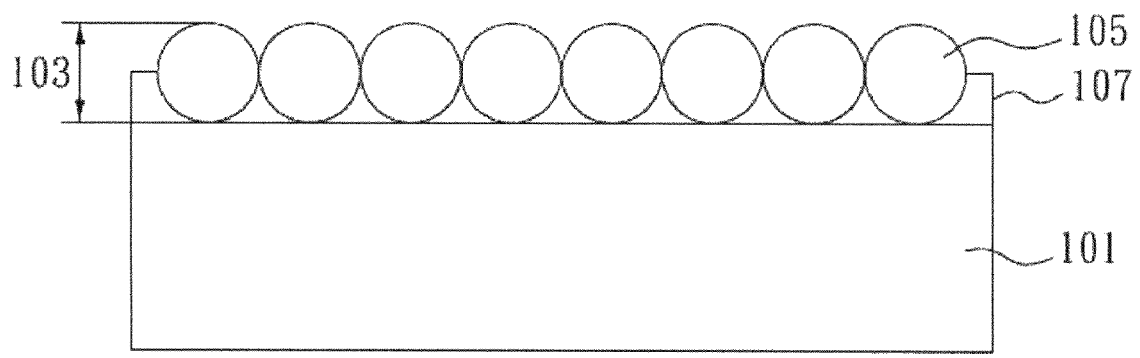
FIG. 1 is a schematic view of an optical film according to the present invention.

FIG. 1 is a schematic view of an optical film according to one preferable embodiment of the present invention. As shown in FIG. 1, the optical film of the present invention includes a transparent substrate 101, and a resin coating 103 having a convex-concave structure on one surface of the transparent substrate 101. The resin coating 103 includes a plurality of organic particles 105 and a binder 107. In order to obtain an excellent light diffusion effect, the coating thickness of the binder 107 is preferably approximately from two fifths to three fifths of the particle size of the organic particles, and is more preferably approximately a half of the particle size of the organic particles (i.e., the hemispheric height). Furthermore, the organic particles are uniformly distributed in the resin coating in a single layer.

The transparent substrate 101 used in the optical film of the present invention can be any substrate known to persons having ordinary skill in the art, such as glass or plastic. The plastic substrate is not particularly limited and can be any one known to persons having ordinary skill in the art, which includes, for example, but is not limited to, polyester resins, such as polyethylene terephthalate (PET) and polyethylene naphthalate (PEN); polyacrylate resins, such as polymethyl methacrylate (PMMA); polyimide resins; polystyrene resins; polycycloolefin resins; polyolefin resins; polycarbonate resins; polyurethane resins; triacetate cellulose (TAC); or a mixture thereof. The preferred substrates are those formed from polyethylene terephthalate, polymethyl methacrylate, polycycloolefin resin, or triacetate cellulose, or a mixture thereof. More preferably, the substrate is polyethylene terephthalate. The thickness of the first optical layer is preferably in the range from about 16 μm to about 250 μm, usually depending on the desired purpose of an optical product.

In order to achieve a light diffusion effect, the resin coating 103 is coated on one surface of the substrate 101. The resin coating 103 contains the organic particles 105 and the binder 107. The organic particles 105 contained in the resin coating 103 are formed from a polymethacrylate resin that contains at least one mono-functional acrylate monomer and at least one multi-functional acrylate monomer as polymerization units, and all the multi-functional acrylate monomers are in an amount from about 30 wt % to 70 wt % based on the total weight of the monomers. According to the present invention, at least one multi-functional monomer is used, such that the monomers undergo crosslinking reaction with each other, and the crosslinking degree of the obtained organic particles can be enhanced. Therefore, the hardness of the organic particles is enhanced so as to enhance the scratch resistance and wear resistance properties of the organic particles, and to improve the solvent resistance property of the particles.

The mono-functional acrylate monomer suitable for the present invention is selected from, but not limited to, the group consisting of methyl methacrylate (MMA), butyl methacrylate, 2-phenoxy ethyl acrylate, ethoxylated 2-phenoxy ethyl acrylate, 2-(2-ethoxyethoxy)ethyl acrylate, cyclic trimethylolpropane formal acrylate, β-carboxyethyl acrylate, lauryl methacrylate, isooctyl acrylate, stearyl methacrylate, isodecyl acrylate, isobornyl methacrylate, benzyl acrylate, 2-hydroxyethyl methacrylate phosphate, hydroxyethyl acrylate (HEA), and 2-hydroxyethyl methacrylate (HEMA), and a mixture thereof.

The multi-functional acrylate monomer suitable for the present invention is selected from, but not limited to, the group consisting of hydroxypivalyl hydroxypivalate diacrylate, ethoxylated 1,6-hexanediol diacrylate, dipropylene glycol diacrylate, tricyclodecane dimethanol diacrylate, ethoxylated dipropylene glycol diacrylate, neopentyl glycol diacrylate, propoxylated neopentyl glycol diacrylate, ethoxylated bisphenol-A dimethacrylate, 2-methyl-1,3-propanediol diacrylate, ethoxylated 2-methyl-1,3-propanediol diacrylate, 2-butyl-2-ethyl-1,3-propanediol diacrylate, ethylene glycol dimethacrylate (EGDMA), diethylene glycol dimethacrylate, tris(2-hydroxy ethyl)isocyanurate triacrylate, pentaerythritol triacrylate, ethoxylated trimethylolpropane triacrylate, propoxylated trimethylolpropane triacrylate, trimethylolpropane trimethacrylate, pentaerythritol tetraacrylate, ethoxylated pentaerythritol tetraacrylate, ditrimethylolpropane tetraacrylate, propoxylated pentaerythritol tetraacrylate, pentaerythritol tetraacrylate, dipentaerythritol hexaacrylate, tripropylene glycol dimethacrylate, 1,4-butanediol dimethacrylate, 1,6-hexanediol dimethacrylate, allylated cyclohexyl dimethacrylate, isocyanurate dimethacrylate, ethoxylated trimethylol propane trimethacrylate, propoxylated glycerol trimethacrylate, trimethylol propane trimethacrylate, and tris(acryloxyethyl)isocyanurate, and a mixture thereof.

According to a preferred embodiment of the present invention, the organic particles 105 contained in the resin coating 103 are polyacrylate resin particles formed from the monomers containing methyl methacrylate and ethylene glycol dimethacrylate, where the weight ratio of the methyl methacrylate monomer to the ethylene glycol dimethacrylate monomer can be 70:30, 60:40, 50:50, 40:60 or 30:70. When the amount of the ethylene glycol dimethacrylate monomer is about 30 wt % to about 70 wt % based on the total weight of the monomers, a preferable crosslinking degree can be obtained.

According to the present invention, the shape of the plurality of the organic particles is not particularly limited, and can be, for example, spherical or elliptic or irregular shapes, of which the spherical shape is preferred. The organic particles have a single mean particle size ranging from about 5 µm to about 30 µm, preferably from about 10 µm to about 25 µm. More preferably, the organic particles have a mean particle size of about 10, 15, or 20 µm. The organic particles provide a light scattering effect. In order to enhance the luminance of the optical film, the organic particles used in the present invention have a highly uniform particle size distribution, ranging within about ±5%, and preferably ranging within about ±4% of the mean particle size of the particles. For example, according to the present invention, if the organic particles having a mean particle size of about 15 µM, the particle size distribution of the organic particles 105 in the resin coating ranges within about 14.25 µm to about 15.75 µm, and preferably ranges within about 14.4 µm to about 15.6 µm. As compared with the organic particles having a mean particle size of about 15 µm and a particle size distribution within about 1 µm to about 30 µm used in the prior art, the organic particles used in the present invention not only have a single mean particle size, but the particle size distribution is relatively narrow, so the present invention can avoid wastes of the light source caused by an excessively large light scattering range due to the significant difference in the particle size of the organic particles, thereby enhancing the luminance of the optical film.

The binder contained in the resin coating 103 is preferably colorless and transparent, so as to allow the light to pass there through. The binder of the present invention can be selected from the group consisting of a ultraviolet (UV) curing resin, a thermal setting resin, and a thermal plastic resin, and a mixture thereof, which is optionally processed by heat curing, UV curing, or heat and UV dual curing, so as to form the resin coating of the present invention. In an embodiment of the present invention, in order to enhance the hardness of the coating and prevent the film from warping, the binder contains a UV curable resin and a resin selected from the group consisting of a thermal setting resin and a thermal plastic resin and a mixture thereof, and is treated by heat and UV dual curing, so as to form a resin coating with excellent heat-resistant property and extremely low volume shrinkage.

The UV curable resin useful in the present invention is formed from at least one acrylic monomer or acrylate monomer having one or more functional groups, of which the acrylate monomer is preferred. The acrylate monomer suitable for the present invention includes, but is not limited to, a methacrylate monomer, an acrylate monomer, a urethane acrylate monomer, a polyester acrylate monomer, or an epoxy acrylate monomer, among which the (meth)acrylate monomer is preferred.

For example, the (meth)acrylate monomer suitable for the UV curable resin used in the present invention is selected from the group consisting of methyl methacrylate, butyl acrylate, 2-phenoxy ethyl acrylate, ethoxylated 2-phenoxy ethyl acrylate, 2-(2-ethoxyethoxy)ethyl acrylate, cyclic trimethylolpropane formal acrylate, β-carboxyethyl acrylate, lauryl methacrylate, isooctyl acrylate, stearyl methacrylate, isodecyl acrylate, isobornyl methacrylate, benzyl acrylate, hydroxypivalyl hydroxypivalate diacrylate, ethoxylated 1,6-hexanediol diacrylate, dipropylene glycol diacrylate, tricyclodecane dimethanol diacrylate, ethoxylated dipropylene glycol diacrylate, neopentyl glycol diacrylate, propoxylated neopentyl glycol diacrylate, ethoxylated bisphenol-A dimethacrylate, 2-methyl-1,3-propanediol diacrylate, ethoxylated 2-methyl-1,3-propanediol diacrylate, 2-butyl-2-ethyl-1,3-propanediol diacrylate, ethylene glycol dimethacrylate, diethylene glycol dimethacrylate, 2-hydroxyethyl methacrylate phosphate, tris(2-hydroxy ethyl)isocyanurate triacrylate, pentaerythritol triacrylate, ethoxylated trimethylolpropane triacrylate, propoxylated trimethylolpropane triacrylate, trimethylolpropane trimethacrylate, pentaerythritol tetraacrylate, ethoxylated pentaerythritol tetraacrylate, ditrimethylolpropane tetraacrylate, propoxylated pentaerythritol tetraacrylate, pentaerythritol tetraacrylate, dipentaerythritol hexaacrylate, hydroxyethyl acrylate (HEA), 2-hydroxyethyl methacrylate (HEMA), tripropylene glycol dimethacrylate, 1,4-butanediol dimethacrylate, 1,6-hexanediol dimethacrylate, allylated cyclohexyl dimethacrylate, isocyanurate dimethacrylate, ethoxylated trimethylol propane trimethacrylate, propoxylated glycerol trimethacrylate, trimethylol propane trimethacrylate, and tris(acryloxyethyl) isocyanurate, and a mixture thereof. Preferably, the acrylate monomers contain dipentaerythritol hexaacrylate, trimethylolpropane triacrylate, and pentaerythritol triacrylate.

In order to improve the film-forming property of the resin coating 103, the UV curable resin used in the present invention can optionally contain an oligomer having a molecular weight in a range from $10^3$ to $10^4$. Such oligomers are well known to persons having ordinary skill in the art, such as, acrylate oligomers, which include, for example, but are not limited to, urethane acrylates, such as aliphatic urethane acrylates, aliphatic urethane hexaacrylates, and aromatic urethane hexaacrylates; epoxy acrylates, such as bisphenol-A epoxy diacrylate and novolac epoxy acrylate; polyester acrylates, such as polyester diacrylate; or homo-acrylates.

The thermal setting resin suitable for the present invention typically has an average molecular weight in a range from $10^4$ to $2\times10^6$, preferably from $2\times10^4$ to $3\times10^5$, and more preferably from $4\times10^4$ to $10^5$. The thermal setting resin of the present invention can be selected from the group consisting of a carboxyl (—COOH) and/or hydroxyl (—OH) group-containing polyester resin, epoxy resin, polyacrylate resin, polymethacrylate resin, polyamide resin, fluoro resin, polyimide resin, polyurethane resin, and alkyd resin, and a mixture thereof, of which the polymethacrylate resin or polyacrylate resin containing a carboxy (—COOH) and/or hydroxyl (—OH) group is preferred, such as a polymethacrylic polyol resin.

The thermal plastic resin that can be used in the present invention is selected from the group consisting of polyester resins; polymethacrylate resins, such as polymethyl methacrylate (PMMA); and a mixture thereof.

The thickness of the resin coating of the optical film of the present invention normally depends on the requirements of the desired product, and is typically in the range from about 5 µm to about 30 µm, preferably in the range from about 10 µm to about 20 µm.

According to the present invention, the organic particles are uniformly distributed in the resin coating in a single layer. In comparison with the overlapping distribution of particles adopted in known technologies, the single-layer uniform distribution can not only reduce the raw material cost, but also reduce the wastes of the light source, thus enhancing the luminance of the optical film. That is, as shown in FIG. 1, the particles 105 are distributed in the resin coating 105 in a single layer, wherein the film thickness is measured so as to confirm that there is only one particle in the same place, and the overlapping situation of having two particles in the same place is not occurred. Furthermore, in order to optimize diffusion effect, the coating thickness of the binder 107 is approximately from two fifths to three fifths of the particle size of the organic particles 105, and is preferably approximately a half of the particle size of the organic particles 105 (i.e., the hemispheric height).

Figure 3:
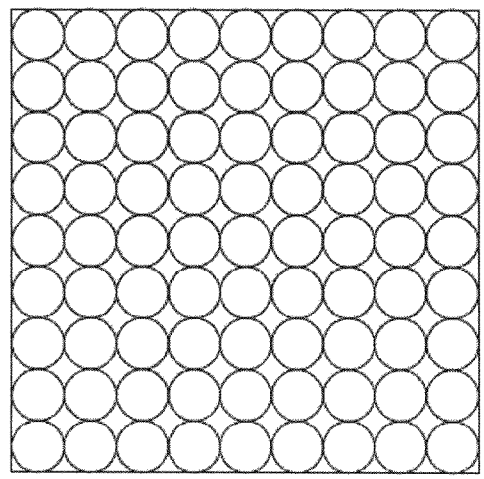
FIG. 3 is a vertical view of the particle distribution of the optical film of the present invention.
Figure 4A:
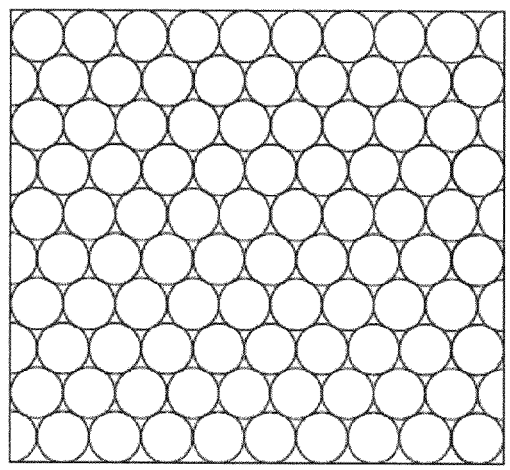
FIGS. 4A and 4B are vertical views of the particle distributions of another embodiment of the present invention.
Figure 4B:
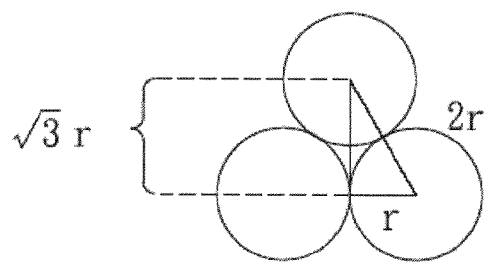

The vertical views of the preferable distributions of the organic particles 105 in the resin coating 103 are shown in FIGS. 3, 4A and 4B. The reasonable ratio range of the organic particles to binder is deduced on the basis of these concrete embodiments of the present invention.

At first, when the vertical view of the distribution of the organic particles 105 in the resin coating 103 is as shown in FIG. 3, the ratio of the organic particles to binder is deduced with the assumption that the coating thickness of the binder is a half of the particle size of the organic particles. Seikisui SSX-120 (polyacrylate particles having a diameter of 20 µm; assuming the radius of 10 µm is "r" and the specific gravity of 1.2 g/cm$^3$ is "d") is used as the organic particles of the present invention. The ratio of the organic particles to binder within an area of 1 m$^2$ is calculated as follows:

The weight of one polyacrylate particle having a diameter of 20 µm: the specific gravity of the polyacrylate particles×its volume=d×4/3πr$^3$=1.2 g/cm$^3$×4/3×3.14×(10×10$^{-4}$ cm)$^3$=5.024×10$^{-9}$ g.

The number of particles within an area of 1 m$^2$: [1 m/(20×10$^{-6}$ m)]$^2$=2.5×10$^9$.

The total weight of particles within an area of 1 m$^2$: 2.5×10$^9$×5.024×10$^{-9}$ g=12.56 g.

The amount of the binder used to achieve a hemispheric coating thickness (10 µm) within an area of 1 m$^2$: (1 m$^2$×particle radius−the number of particles within an area of 1 m$^2$×the hemispheric volume of a particle)×the specific gravity of acrylic binder=((100 cm)$^2$×10×10$^{-4}$ cm−2.5×10$^9$×1/2×4/3×3.14×(10×10$^{-4}$ cm)$^3$)×1.2 g/cm$^3$=5.72 g.

The weight of particles/the weight of binder: 12.56/5.72≅220/100.

The coating amount within an area of 1 m$^2$=the weight of particles+the weight of binder=12.56 g+5.72 g=18.28 g.

Furthermore, when the vertical view of the distribution of the organic particles 105 in the resin coating 103 is as shown in FIGS. 4A and 4B, the ratio of the organic particles to binder is deduced with the assumption that the coating thickness of the binder is a half of the particle size of the organic particles. Similarly, Seikisui SSX-120 (polyacrylate particles having a diameter of 20 µm; assuming the radius of 10 µm is "r" and the specific gravity of 1.2 g/cm$^3$ is "d") is used as the organic particles of the present invention. The ratio of the organic particles to binder within an area of 1 m$^2$ is calculated as follows:

The weight of one polyacrylate particle having a diameter of 20 µm: the specific gravity of the polyacrylate particles×its volume=d×4/3πr$^3$=1.2 g/cm$^3$×4/3×3.14×(10×10$^{-4}$ cm)$^3$=5.024×10$^{-9}$ g.

The number of particles within an area of 1 m$^2$: [1 m/($\sqrt{3}$×10×10$^{-6}$ m)]×[1 m/(20×10$^{-6}$ m)]=2.8868×10$^9$.

The total weight of particles within an area of 1 m$^2$: 2.8868×10$^9$×5.024×10$^{-9}$ g=14.5033 g.

The amount of the binder used to achieve a hemispheric coating thickness (10 µm) within an area of 1 m$^2$: (1 m$^2$×particle radius−the number of particles within an area of 1 m$^2$×the hemispheric volume of a particle)×the specific gravity of acrylic binder=((100 cm)$^2$×10×10$^{-4}$ cm−2.8868×10$^9$×1/2×4/3×3.14×(10×10$^{-4}$ cm)$^3$)×1.2 g/cm$^3$=4.7484 g.

The weight of particles/the weight of binder: 14.5033/4.7484≅305/100.

The coating amount within an area of 1 m$^2$=the weight of particles+the weight of binder=14.5033 g+4.7484 g=19.2517 g.

Therefore, in the resin coating of the present invention, the organic particles are in an amount from about 180 to about 320 parts by weight per 100 parts by weight of the solids content of the binder, preferably about 220 to about 305 parts by weight per 100 parts by weight of the solids content of the binder.

In addition to the organic particles and the binder, the resin coating of the present invention may optionally contain any additives known to persons having ordinary skill in the art, which include, but are not limited to, an anti-static agent, a curing agent, a photo initiator, a fluorescent whitening agent, a UV absorber, a leveling agent, a wet agent, a stabilizing agent, a dispersant, or inorganic particulates.

The anti-static agent suitable for the present invention is not particularly limited, and can be any anti-static agent well known to persons having ordinary skill in the art, such as ethoxy glycerin fatty acid esters, quaternary amine compounds, aliphatic amine derivatives, epoxy resins (such as polyethylene oxide), siloxane, or other alcohol derivatives, such as poly(ethylene glycol) ester, poly(ethylene glycol) ether and the like.

The curing agent suitable for the present invention can be any curing agent well known to persons having ordinary skill in the art and capable of making the molecules to be chemically bonded with each other to form crosslinking, and can be, for example, but is not limited to, diisocyanate or polyisocyanate. When the resin coating of the present invention contains a curing agent, the organic particles of the present invention may optionally be prepared from the monomers containing a hydroxyl group (—OH), a carboxy group (—COOH), or an amino group (—NH$_2$), preferably a hydroxyl group, such that the organic particles can contain surface functional groups and can directly react with the curing agent in the resin coating, so as to improve the adhesion, to reduce the amount of the binder, and to enhance the luminance of the optical film. Examples of the monomers containing a hydroxyl group include, but are not limited to, hydroxyethyl acrylate (HEA), hydroxypropyl acrylate (HPA), 2-hydroxyethyl methacrylate (HEMA), and hydroxypropyl methacrylate (HPMA), and a mixture thereof.

The photo initiator used in the present invention will generate free radicals after being irradiated, and initiate a polymerization through delivering the free radicals. The photo initiator applicable to the present invention is not particularly limited. Examples of the photo initiator include, but are not limited to, benzophenone, benzoin, 2-hydroxy-2-methyl-1-phenyl-propan-1-one, 2,2-dimethoxy-1,2-diphenylethan-1-one, 1-hydroxy cyclohexyl phenyl ketone, 2,4,6-trimethylbenzoyl diphenyl phosphine oxide, or the mixture thereof. Preferably, the photo initiator is benzophenone or 1-hydroxy cyclohexyl phenyl ketone.

The fluorescent whitening agent suitable for the present invention is not particularly limited, and can be any fluorescent whitening agent well known to persons having ordinary skill in the art, which can be an organic, including, for example, but being not limited to, a benzoxazole, benzimidazole, or diphenylethylene bistriazine; or an inorganic, including, for example, but being not limited to, zinc sulfide.

The UV absorber suitable for the present invention can be any UV absorber well known to persons having ordinary skill in the art, for example, a benzotriazole, a benzotriazine, a benzophenone, or a salicylic acid derivative.

Moreover, when the substrate 101 is a plastic substrate, in order to prevent the plastic substrate from yellowing, inorganic particulates capable of absorbing UV light can be optionally added to the resin coating 103, which can be, for example, but are not limited to, zinc oxide, zirconia, alumina, strontium titanate, titanium dioxide, calcium sulphate, barium sulfate, or calcium carbonate, or a mixture thereof, of which titanium dioxide, zirconia, alumina, zinc oxide, or a mixture thereof is preferred. The particle size of the above-mentioned inorganic particulates is typically in the range from about 1 nanometer (nm) to about 100 nm, preferably from about 20 nm to about 50 nm.

Figure 2:
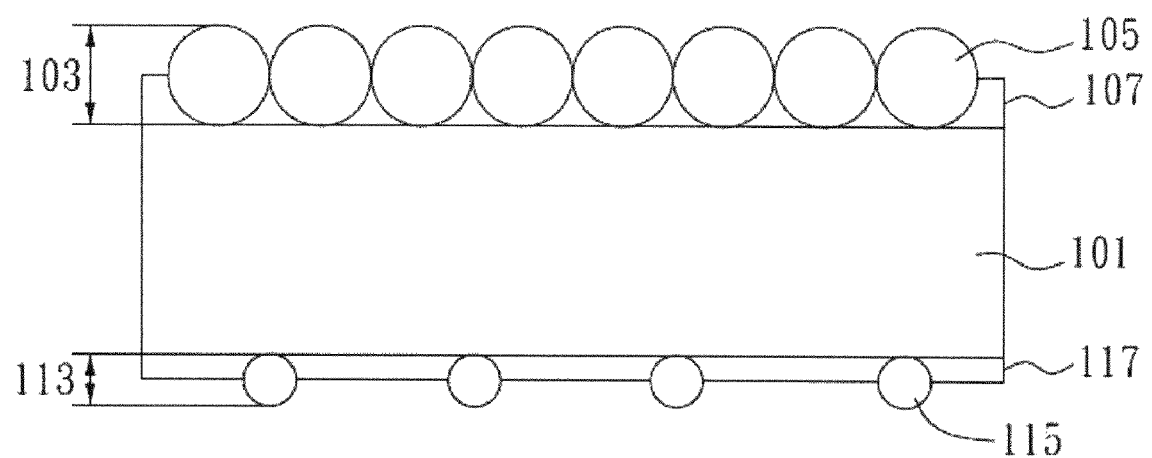
FIG. 2 is a schematic view of an optical film according to an embodiment of the present invention.

In order to avoid the adsorption effect between the optical film of the present invention and other backlight module elements and to improve the diffusion effect, in the optical film of the present invention, an anti-adhesion layer with a thickness in the range from about 1 µm to about 10 µm is optionally coated on the other side of the substrate. As shown in FIG. 2, in another embodiment of the present invention, the substrate 101 has the resin coating 103 containing a plurality of organic particles 105 and a binder 107 on one side and has an anti-adhesion layer 113 containing a plurality of organic particles 115 and a binder 117 on the other side.

The types of the binder 117 and organic particles 115 applicable for the anti-adhesion layer 113 are as those defined hereinbefore.

The organic particles 115 are in an amount from about 0.1 to about 5 parts by weight per 100 parts by weight of the solids content of the binder 117. The organic particles 115 have a mean particle size from about 1 µm to about 10 µm, preferably about 5, 8, or 10 µm, most preferably about 8 µm. The particle size distribution of the organic particles 115 is not particularly limited, which can be a wide particle size distribution or a narrow particle size distribution, and can also be a single-peak distribution or a multi-peak distribution. Optionally, the organic particles 115 used in the anti-adhesion layer 115 can also be uniform in particle size. In other words, the organic particles having a particle size distribution ranging within about ±5% of the mean particle size, preferably within about ±4% of the mean particle size, can also be used to prepare the anti-adhesion layer.

The anti-adhesion layer and the resin coating of the optical film of the present invention can have the same or different compositions. In other words, the same or different organic particles, binders, and optional additives are used to compose the anti-adhesion layer and the resin coating. According to the present invention, the anti-adhesion layer may contain any additives known to persons having ordinary skill in the art, including, for example, but being not limited to, a leveling agent, a stabilizing agent, an anti-static agent, a curing agent, a fluorescent whitening agent, a photo initiator, a UV absorber, or inorganic particulates. The types of the above-mentioned additives, including the anti-static agent, curing agent, fluorescent whitening agent, photo initiator, UV absorber and inorganic particulates, are as those described hereinbefore.

The optical film of the present invention has a haze in the range of about 80% to about 98% as measured according to JIS K7136 standard method, and preferably, has a total light transmittance of no less than about 60% as measured according to JIS K7136 standard method. Therefore, the optical film of the present invention can be used in light source devices, for example, advertising light boxes and flat panel displays, particularly in liquid crystal displays. The inventive optical film is disposed above the light-emitting surface of a surface light source device as a diffusion film, thereby achieving the efficacy of diffusing the light. Moreover, the optical film of the present invention not only can effectively diffuse the light, but also has a desirable luminance, such that two or three optical films of the present invention can be used as diffusion films as a substitute for the conventional design with a brightness enhancement film in combination with other diffusion films, to provide desirable light diffusion efficiency and luminance.

Figure 5:
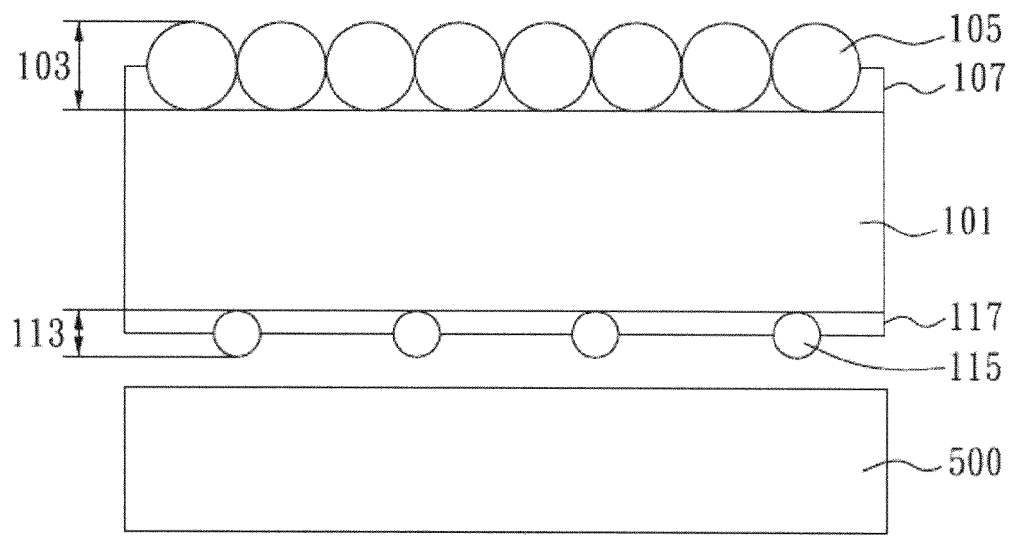
FIG. 5 is a schematic view of an embodiment of the present invention that includes the optical film according to the present invention in combination with a light guide plate or a diffusion film.
Figure 6:
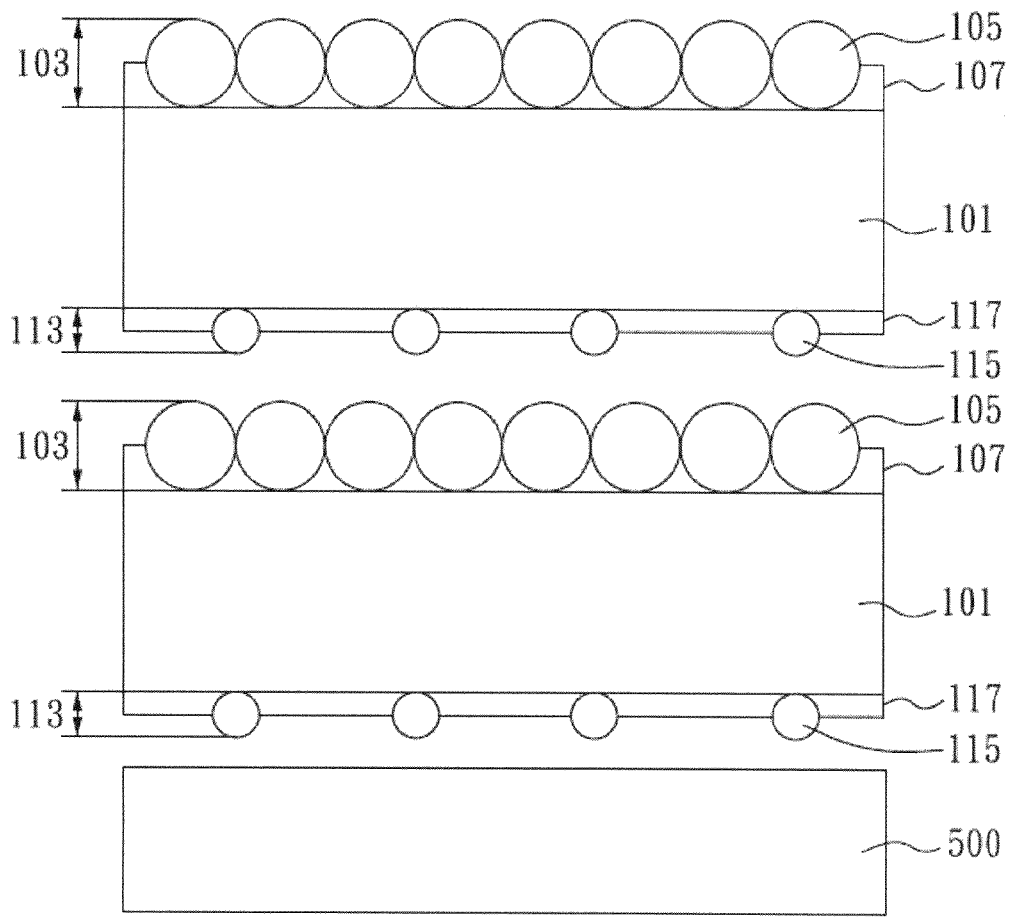
FIG. 6 is a schematic view of another embodiment of the present invention that includes the optical film according to the present invention in combination with a light guide plate or a diffusion film.
Figure 7:
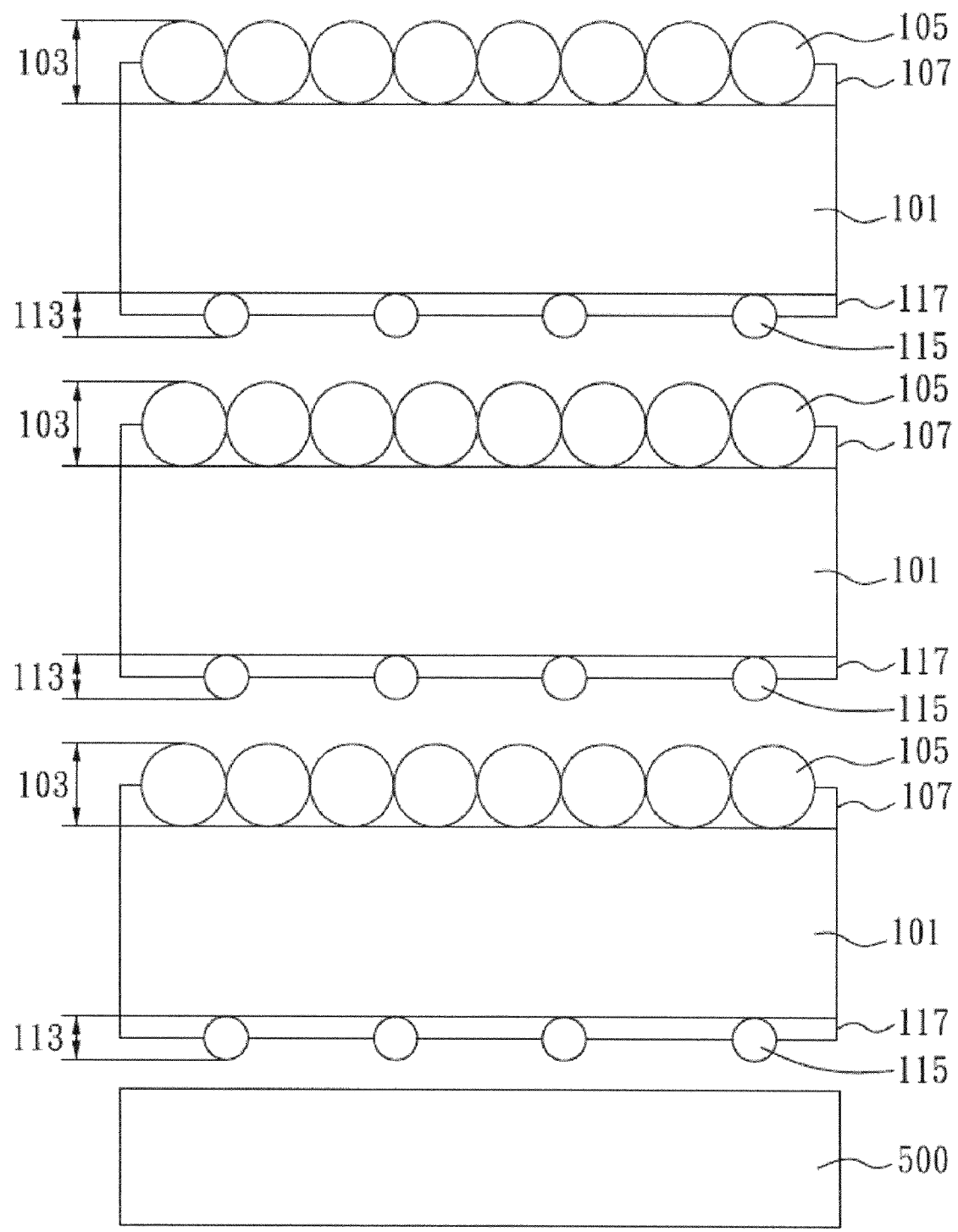
FIG. 7 is a schematic view of yet another embodiment of the present invention that includes the optical film according to the present invention in combination with a light guide plate or a diffusion film.

As shown in FIG. 5, one piece of the optical film of the present invention as shown in FIG. 2 is stacked on the light guide plate or the diffusion plate 500. If necessary, the optical film of the present invention can be stacked repeatedly to improve the luminance, so as to achieve the effect of enhancing the luminance through using a plurality of diffusion layers. For example, as shown in FIG. 6, two pieces of the optical films of the present invention as shown in FIG. 2 are stacked on the light guide plate or the diffusion plate 500; or as shown in FIG. 7, three pieces of the optical films of the present invention as shown in FIG. 2 are stacked on the light guide plate or the diffusion plate 500. Furthermore, more than three optical films can be stacked depending upon the actual demands.

Figure 8:
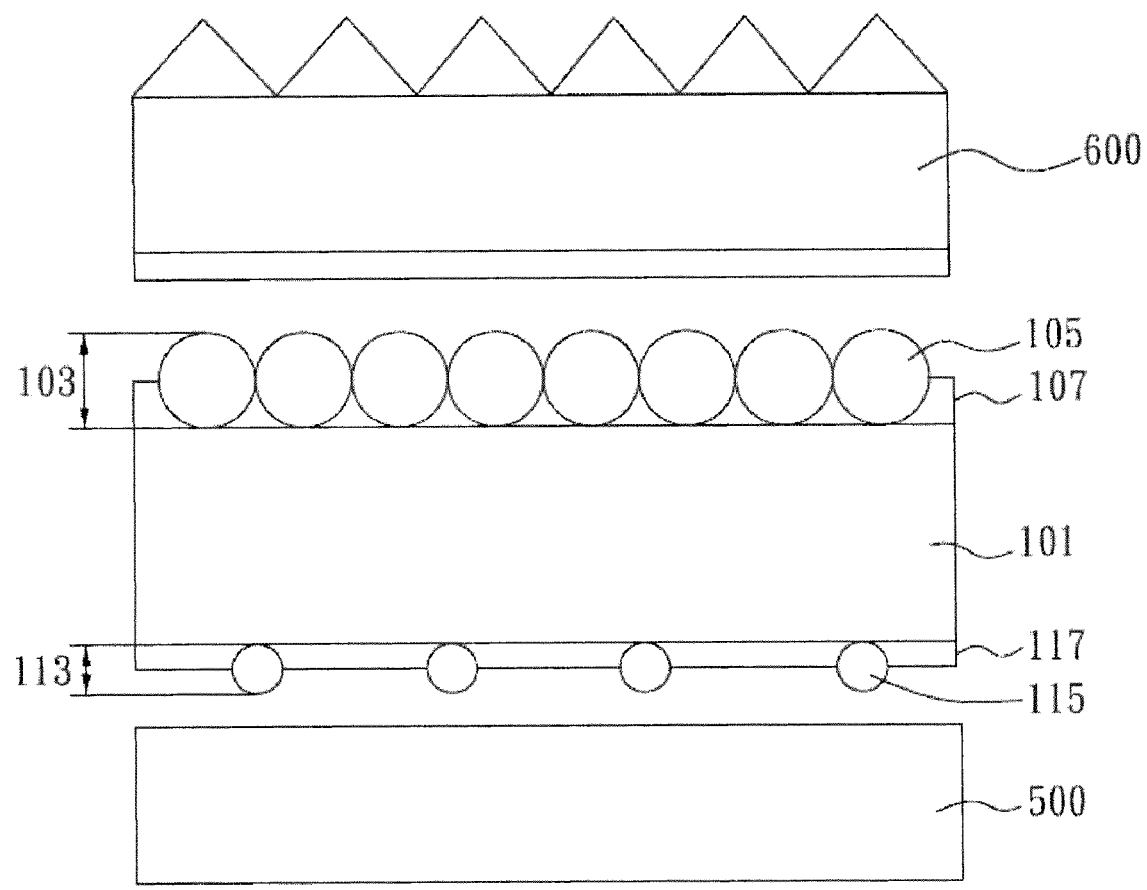
FIG. 8 is a schematic view of an embodiment of the present invention that includes the optical film according to the present invention in combination with a light guide plate or a diffusion film and a brightness enhancement film.

FIG. 8 relates to another application of the optical film of the present invention, in which one piece of the optical film as shown in FIG. 2 is stacked on the light guide plate or the diffusion plate 500, and a brightness enhancement film 600 is further stacked thereon. The brightness enhancement film suitable for this application is not particularly limited, and can be any brightness enhancement films known to persons having ordinary skill in the art.

The following examples are used to further illustrate the present invention, but not intended to limit the scope of the present invention. Any modifications or alterations that can easily be accomplished by persons skilled in the art fall within the scope of the disclosure of the specification and the appended claims.

Preparation Example 1

Preparation of UV Curable Resin

In a 250 mL glass bottle, 40 g toluene was added. Acrylate monomers comprising 10 g of dipentaerythritol hexaacrylate, 2 g of trimethylolpropane triacrylate and 14 g of pentaerythritol triacrylate, oligomers (30 g of aliphatic urethane hexaacrylate [Etercure 61456-100, Eternal Company]), and a photo initiator (4 g of 1-hydroxy cyclohexyl phenyl ketone)

were added sequentially while stirring at a high speed; and finally, about 100 g of a UV curable resin with a solids content of about 60% was prepared.

Preparation Example 2

Organic Particles/Solids Content of Binder=180/100

In a 250 mL glass bottle, a solvent of 30 g toluene and 10 g butanone was added. 30 g of acrylic resin particles [SSX-115, Seikisui Company, Japan] [highly-crosslinked organic particles containing MMA and EGDMA monomers in a weight ratio of 50:50; having a particle size distribution of 15 µm+5%] having a mean particle size of 15 µm, and 28 g of the UV curable resin obtained from Preparation Example 1 (with a solids content of about 60%, Eternal Company), and 2 g of an anti-static agent [GMB-36M-AS, Marubishi Oil Chem. Co., Ltd] (with a solids content of about 20%) were sequentially added while stirring at a high speed; and finally, about 100 g of a coating with a solids content of about 47% was prepared. Then, the coating was coated on a surface of a PET substrate (U34®, Toray Company) having a thickness of 188 µm with an RDS Bar Coater #12, dried for 1 minute at 110° C., and exposed to a UV curing machine (Fusion UV, F600V, 600 W/inch, H-type light source; the power was set on 100%, the speed was 15 m/min, and the energy beam was 200 mJ/cm$^2$). After drying, a first diffusion layer (a resin coating) having a thickness of about 17 µm was prepared.

Preparation Example 3

Organic Particles/Solids Content of Binder=220/100

In a 250 mL glass bottle, a solvent of 32 g toluene and 10 g butanone was added. 32 g of acrylic resin particles [SSX-115, Seikisui Company, Japan] [highly-crosslinked organic particles containing MMA and EGDMA monomers in a weight ratio of 50:50; having a particle size distribution of 15 µm±5%] having a mean particle size of 15 µm, and 24 g of the UV curable resin obtained from Preparation Example 1 (with a solids content of about 60%, Eternal Company), and 2 g of an anti-static agent [GMB-36M-AS, Marubishi Oil Chem. Co., Ltd] (with a solids content of about 20%) were sequentially added while stirring at a high speed; and finally, about 100 g of a coating with a solids content of about 47% was prepared. Then, the coating was coated on a surface of a PET substrate (U34®, Toray Company) having a thickness of 188 µm with an RDS Bar Coater #12, dried for 1 minute at 110° C., and exposed to a UV curing machine (Fusion UV, F600V, 600 W/inch, H-type light source; the power was set on 100%, the speed was 15 m/min, and the energy beam was 200 mJ/cm$^2$). After drying, a first diffusion layer (a resin coating) having a thickness of about 17 µm was prepared.

Preparation Example 4

Organic Particles/Solids Content of Binder=250/100

In a 250 mL glass bottle, a solvent of 30 g toluene and 10 g butanone was added. 34 g of acrylic resin particles [SSX-115, Seikisui Company, Japan] [highly-crosslinked organic particles containing MMA and EGDMA monomers in a weight ratio of 50:50; having a particle size distribution of 15 µm±5%] having a mean particle size of 15 µm, and 22 g of the UV curable resin obtained from Preparation Example 1 (with a solids content of about 60%, Eternal Company), and 2 g of an anti-static agent [GMB-36M-AS, Marubishi Oil Chem. Co., Ltd] (with a solids content of about 20%) were sequentially added while stirring at a high speed; and finally, about 100 g of a coating with a solids content of about 47% was prepared. Then, the coating was coated on a surface of a PET substrate (U34®, Toray Company) having a thickness of 188 µm with an RDS Bar Coater #12, dried for 1 minute at 110° C., and exposed to a UV curing machine (Fusion UV, F600V, 600 W/inch, H-type light source; the power was set on 100%, the speed was 15 m/min, and the energy beam was 200 mJ/cm$^2$). After drying, a first diffusion layer (a resin coating) having a thickness of about 17 µm was prepared.

Preparation Example 5

Organic Particles/Solids Content of Binder=305/100

In a 250 mL glass bottle, a solvent of 32 g toluene and 10 g butanone was added. 36 g of acrylic resin particles [SSX-115, Seikisui Company, Japan] [highly-crosslinked organic particles containing MMA and EGDMA monomers in a weight ratio of 50:50; having a particle size distribution of 15 µm±5%] having a mean particle size of 15 µm, and 20 g of the UV curable resin obtained from Preparation Example 1 (with a solids content of about 60%, Eternal Company), and 2 g of an anti-static agent [GMB-36M-AS, Marubishi Oil Chem. Co., Ltd] (with a solids content of about 20%) were sequentially added while stirring at a high speed; and finally, about 100 g of a coating with a solids content of about 48% was prepared. Then, the coating was coated on a surface of a PET substrate (U34®, Toray Company) having a thickness of 188 µm with an RDS Bar Coater #12, dried for 1 minute at 110° C., and exposed to a UV curing machine (Fusion UV, F600V, 600 W/inch, H-type light source; the power was set on 100%, the speed was 15 m/min, and the energy beam was 200 mJ/cm$^2$). After drying, a first diffusion layer (a resin coating) having a thickness of about 17 µm was prepared.

Preparation Example 6

Organic Particles/Solids Content of Binder=220/100

In a 250 mL glass bottle, a solvent of 32 g toluene and 10 g butanone was added. 32 g of acrylic resin particles [SSX-120, Seikisui Company, Japan] [highly-crosslinked organic particles containing MMA and EGDMA monomers in a weight ratio of 50:50; having a particle size distribution of 20 µm±5%] having a mean particle size of 20 µm, and 24 g of the UV curable resin obtained from Preparation Example 1 (with a solids content of about 60%, Eternal Company), and 2 g of an anti-static agent [GMB-36M-AS, Marubishi Oil Chem. Co., Ltd] (with a solids content of about 20%) were sequentially added while stirring at a high speed; and finally, about 100 g of a coating with a solids content of about 47% was prepared. Then, the coating was coated on a surface of a PET substrate (U34®, Toray Company) having a thickness of 188 µm with an RDS Bar Coater #14, dried for 1 minute at 110° C., and exposed to a UV curing machine (Fusion UV, F600V, 600 W/inch, H-type light source; the power was set on 100%, the speed was 15 m/min, and the energy beam was 200 mJ/cm$^2$). After drying, a first diffusion layer (a resin coating) having a thickness of about 22 μm was prepared.

Examples 1 to 5

Preparation of Second Diffusion Layer
(Anti-Adhesion Layer)

Figure 9:
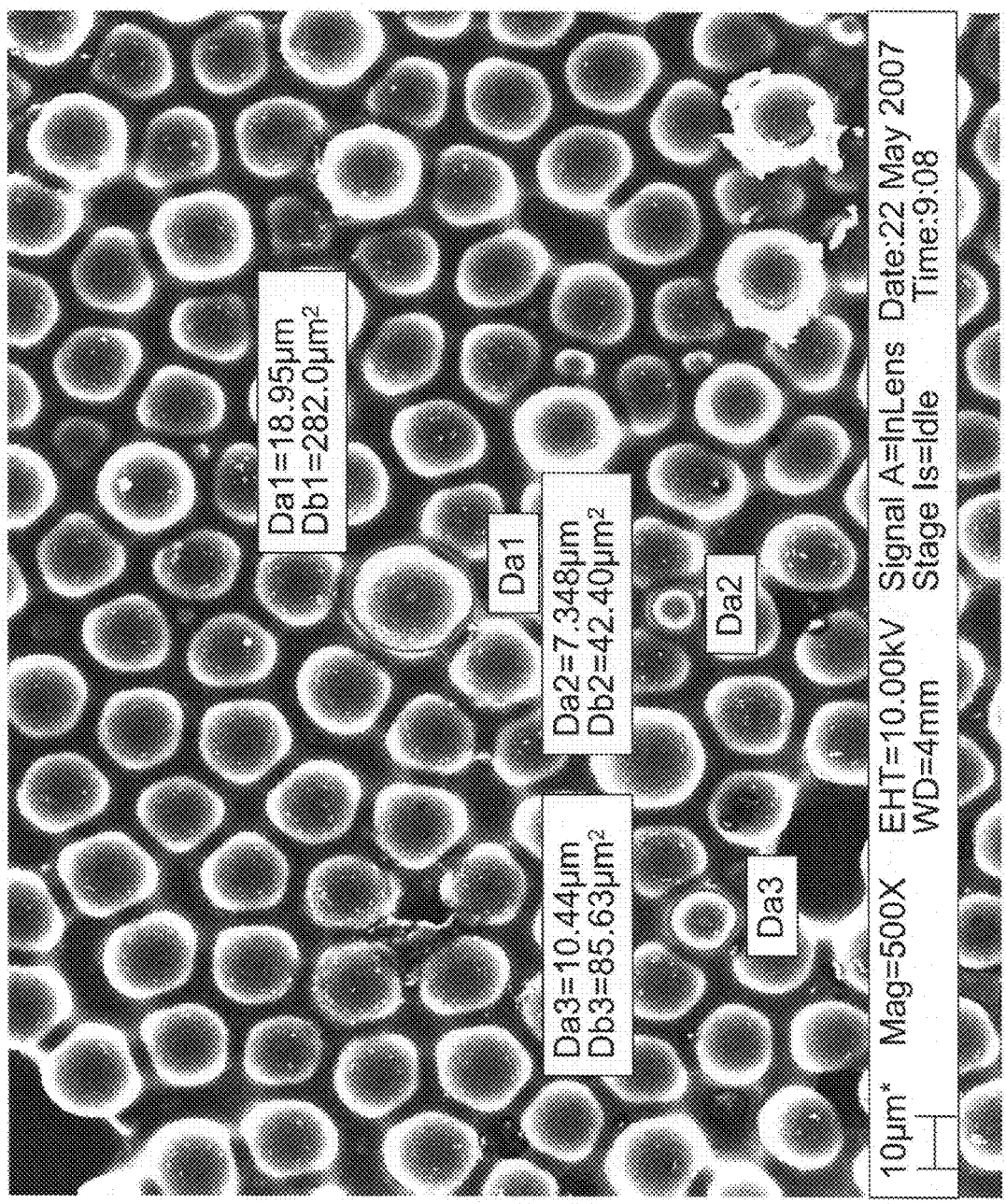
FIG. 9 is a scanning electron microscope (SEM) picture of the vertical view of the first diffusion layer (the resin coating) of the optical film illustrated in Example 2.
Figure 10:
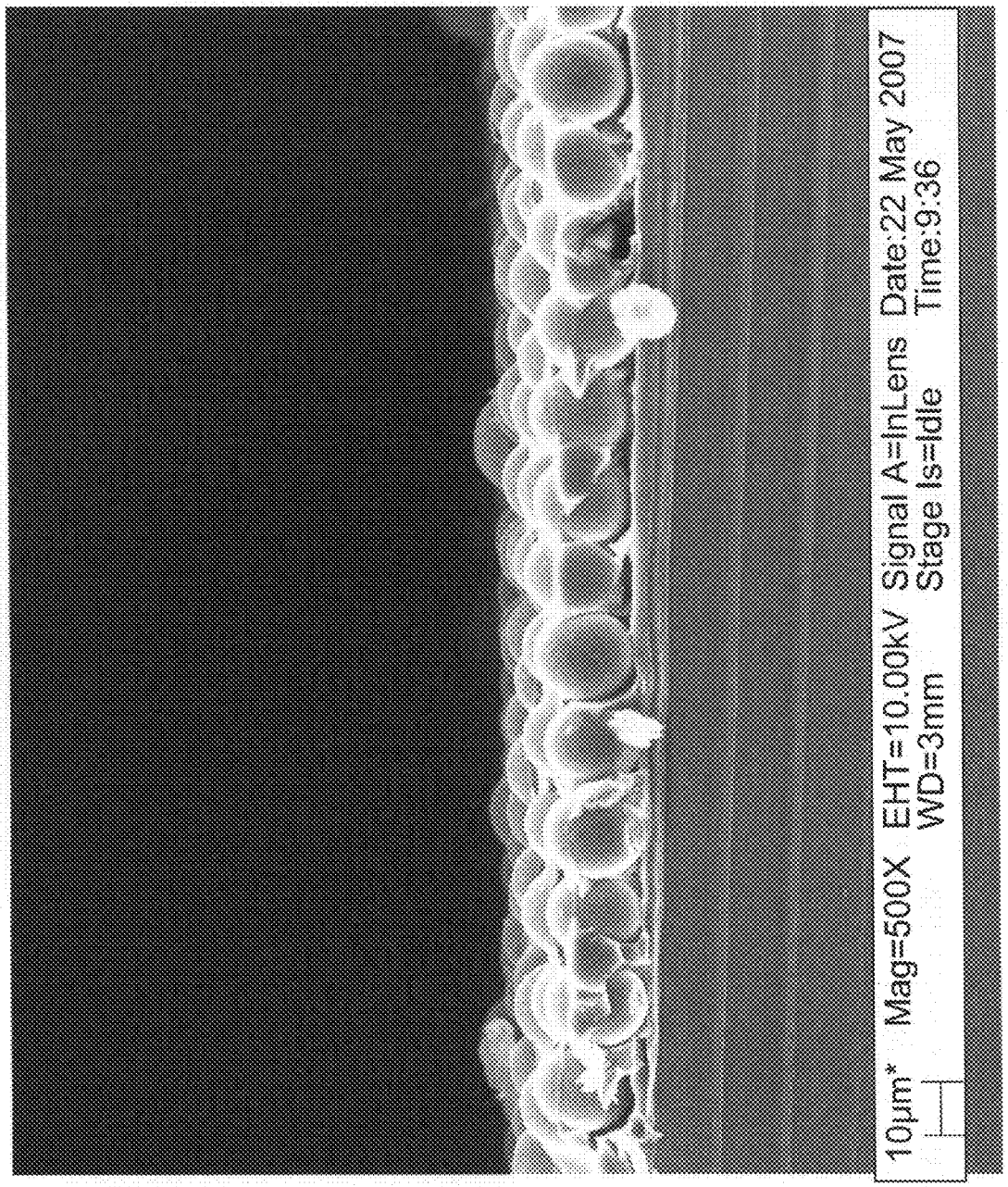
FIG. 10 is a SEM picture of the lateral view of the first diffusion layer (the resin coating) of the optical film illustrated in Example 2.
Figure 11:
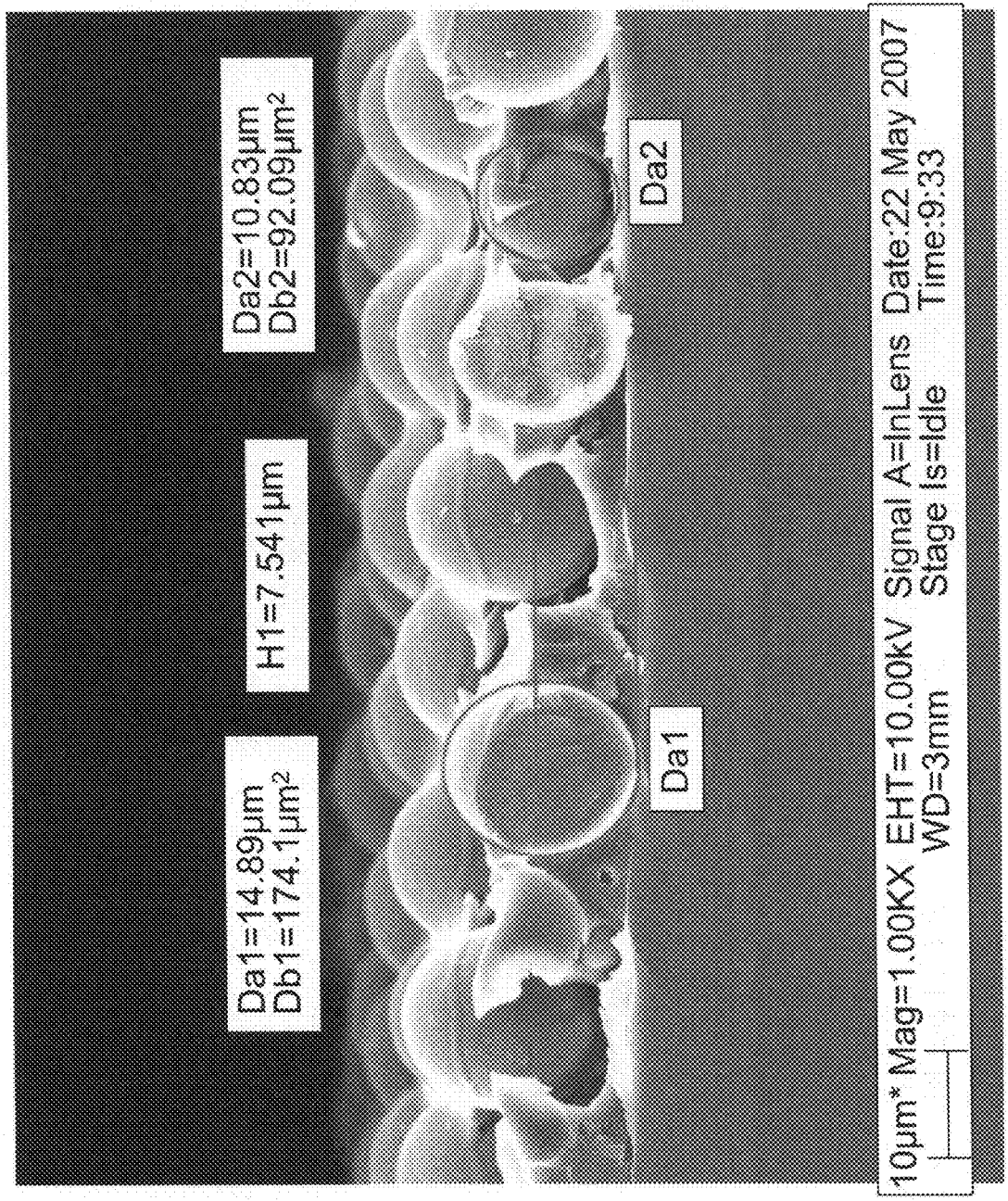
FIG. 11 is a SEM picture of the lateral view of the first diffusion layer (the resin coating) of the optical film illustrated in Example 2.

In a 250 mL glass bottle, a solvent of 24 g toluene and 20 g butanone was added. 1 g of acrylic resin particles [SSX-108, Seikisui Company, Japan] [highly-crosslinked organic particles containing MMA and EGDMA monomers in a weight ratio of 50:50; having a particle size distribution of 8 μm±5%] having a mean particle size of 8 μm, and 25 g of the UV curable resin obtained from Preparation Example 1 (with a solids content of about 60%, Eternal Company), a 26 g of an acrylate resin [Eterac 7361-ts-50, Eternal Company] (with a solids content of about 50%) were added sequentially while stirring at a high speed, and then, 2 g of a curing agent [Desmodur 3390, Bayer Company] (with a solids content of about 75%), and 2 g of an anti-static agent [GMB-36M-AS, Marubishi Oil Chem. Co., Ltd] (with a solids content of about 20%) were added; and finally, about 100 g of a coating with a solids content of about 31% was prepared. Then, the coating was coated on the other surface of the PET substrates of Preparation Examples 2, 3, 4, 5, and 6 that were already coated with the first diffusion layer (the resin coating) on one surface with an RDS Bar Coater #6, respectively, dried for 1 minute at 110° C., and exposed to a UV curing machine (Fusion UV, F600V, 600 W/inch, H-type light source; the power was set on 100%, the speed was 15 m/min, and the energy beam was 200 mJ/cm$^2$). After drying, a second diffusion layer (an anti-adhesion coating) having a thickness of about 8 μm was prepared. The properties of the optical films prepared from Examples 1 to 5 having a total thickness of 213 μm, 213 μm, 213 μm, 213 μm, and 218 μm were tested through the following methods. The results are listed in Tables 1 and 2 below. Moreover, the SEM pictures having the vertical and lateral views of the first diffusion layer (the resin coating) of the optical film illustrated in Example 2 are as shown in FIGS. 9 to 11.

Comparative Example 1

The properties of a commercially available diffusion film [CH283, SKC Company] with a thickness of 213 μm was tested through the following methods, wherein the resin coating on the surface of the substrate comprises a mixture of two groups of organic particles having a mean particle size of 15 μm (having a particle size distribution of 15 μm±15%) and 5 μm (having a particle size distribution of 5 μm±15%), respectively, and both of the two groups of organic particles are low-crosslinked organic particles containing MMA and EGDMA monomers in a weight ratio of 80:20. The results are listed in Table 1 below.

Comparative Example 2

The properties of a commercially available diffusion film [DI-700A, Eternal Company] with a thickness of 210 μm, was tested through the following methods, wherein the resin coating on the surface of the substrate comprises a mixture of two groups of organic particles having a mean particle size of 15 μm (having a particle size distribution ranging from 1 μm to 30 μm) and 5 μm (having a particle size distribution ranging from 1 μm to 10 μm), respectively, and both of the two groups of organic particles are highly-crosslinked organic particles containing MMA and EGDMA monomers in a weight ratio of 60:40. The results are listed in Table 1 below.

Test Method A:

Film Thickness Test: The thicknesses of the films of Examples 1 to 5 and Comparative Examples 1 and 2 were measured with a coating thickness gauge (PIM-100, TESA Corporation) under 1 N pressing contact. The results were recorded above.

Testing Method B:

Haze and Total Transmittance Test: According to JIS K7136 standard method, the test samples were measured for a haze (Hz) and total transmittance (Tt) with a NDH 5000 W Haze Meter (Nippon Denshoku Industries Co., Ltd.). The results are listed in Table 1 below.

Pencil Hardness Test: According to JIS K-5400 method, the test samples were tested with a Pencil Hardness Tester [Elcometer 3086, SCRATCH BOY], using Mitsubishi pencil (2H, 3H). The results of the test are shown in Table 1 below.

Surface Resistivity Test: The surface resistivity of the samples was measured with a Superinsulation Meter [EASTASIA TOADKK Co., SM8220&SME-8310, 500 V]. The testing conditions were: 23±2° C., 55±5% RH. The results of the test are shown in Table 1 below.

Warp Test: The test films were cut into level films with 100 mm length×100 mm width, placed in an oven at 120° C. for 10 min, and then taken out and left at room temperature. After being cooled down to the room temperature, the films were measured for warping level on the four corners with a gap gauge (recording unit: millimeter (mm), recording manner: for example, 0; 0; 0; 0), and thereby, the test samples were evaluated for heat resistance and warp resistance properties. The results of the test are listed in Table 1 below.

TABLE 1

|  | Example 1 | Example 2 | Example 3 | Example 4 | Example 5 | Comparative Example 1 | Comparative Example 2 |
|---|---|---|---|---|---|---|---|
| Haze, Hz (%) | 96.57 | 95.56 | 94.84 | 93.56 | 95.34 | 95.30 | 95.50 |
| Total Light Transmittance, Tt (%) | 72.54 | 71.36 | 70.43 | 68.30 | 70.24 | 71.90 | 74.00 |
| Pencil Hardness (the first diffusion layer) | 3H | 3H | 3H | 3H | 3H | 3H | 3H |
| Pencil Hardness (the second diffusion layer) | 3H | 3H | 3H | 3H | 3H | 2H | 2H |

TABLE 1-continued

|  | Example 1 | Example 2 | Example 3 | Example 4 | Example 5 | Comparative Example 1 | Comparative Example 2 |
|---|---|---|---|---|---|---|---|
| Surface Resistivity $\Omega/\square$ (the first diffusion layer) | $5.0 \times 10^{10}$ | $6.3 \times 10^{10}$ | $4.8 \times 10^{10}$ | $3.9 \times 10^{10}$ | $4.5 \times 10^{10}$ | $1.8 \times 10^{16}$ | $5.6 \times 10^{16}$ |
| Surface Resistivity $\Omega/\square$ (the second diffusion layer) | $7.4 \times 10^{10}$ | $8.5 \times 10^{10}$ | $7.8 \times 10^{10}$ | $6.8 \times 10^{10}$ | $5.3 \times 10^{10}$ | $8.1 \times 10^{10}$ | $6.8 \times 10^{15}$ |
| Warp Test (mm) (120° C., 10 min) | 0; 0; 0; 0 | 0; 0; 0; 0 | 0; 0; 0; 0 | 0; 0; 0; 0 | 0; 0; 0; 0 | 0.2; 0.2; 0.2; 0.2 | 0; 0; 0; 0 |

According to Table 1, the results of the examples and the comparative examples show that the optical films of the present invention have desirable anti-static property and high hardness property and have preferred surface evenness without warping, thus preventing the optical properties from being affected.

Testing Method C:

The films of Examples 1 to 5 and Comparative Examples 1 and 2, and the brightness enhancement films [PF-96S-188] produced by Eternal Company are assembled with backlight source 1 for form various modules for luminance evaluation.

Backlight Source 1: based on a 26" direct-type backlight source, constructed by disposing six U-type cold cathode fluorescent lamps (CCFLs) on an anti-UV reflection film and placing a 2 mm diffusion plate for uniformizing the light source.

Luminance Measurement Method: Central luminance (cd/m$^2$) and 13-point or 25-point luminance of the backlight sources and the modules were measured with a luminance meter, 2° angle [Topcon Company, SC-777] at a distance of 50 cm and normal direction (i.e., at an angle of 0°) from the backlight sources, and the luminance gain and the luminance uniformity were calculated in the following manners. The results were listed in Table 2.

Luminance Gain: a central luminance value of a certain module or backlight source was taken as a base value, the difference between the central luminance value and the base value was divided by the base value and then multiplied by 100%, so as to get the luminance gain of the module or backlight source under test as compared with another module or backlight source.

Luminance Uniformity: the minimum luminance value obtained from the 13-point or 25-point luminance tests was divided by the maximum luminance value and then multiplied by 100% (namely, minimum luminance value/maximum luminance value×100%).

TABLE 2

| 26" Direct-type Backlight Source | Central Luminance (cd/m$^2$) | Luminance Gain (%) | 25-point Luminance Uniformity (%) |
|---|---|---|---|
| Backlight Source 1 | 8,353 | 0 | 95.2 |
| Backlight Source 1 + one film of Example 2 | 11,527 | +38 | 95.3 |
| Backlight Source 1 + two films of Example 2 | 12,530 | +50 | 95.5 |
| Backlight Source 1 + three films of Example 2 | 12,696 | +52 | 95.8 |
| Backlight Source 1 + one film of Example 2 and one brightness enhancement film (PF-96S-188) | 15,537 | +86 | 95.0 |
| Backlight Source 1 + two films of Example 1 | 12,613 | +51 | 95.3 |
| Backlight Source 1 + two films of Example 3 | 12,695 | +52 | 95.5 |
| Backlight Source 1 + two films of Example 4 | 12,673 | +52 | 95.3 |
| Backlight Source 1 + two films of Example 5 | 12,538 | +50 | 95.4 |
| Backlight Source 1 + two films of Comparative Example 1 | 11,694 | +40 | 95.4 |
| Backlight Source 1 + two films of Comparative Example 2 | 11,861 | +42 | 95.4 |

It can be seen from Table 2 that the original 26" direct-type backlight source has a central luminance of 8,353 cd/m$^2$, and if one film of Example 2 is additionally used, a luminance gain of 38% can be obtained and the luminance is enhanced up to 11,527 cd/m$^2$; if two films of Example 2 are additionally used, a luminance gain of 50% can be obtained and the luminance is enhanced up to 12,530 cd/m$^2$; if three films of Example 2 are additionally used, a luminance gain of 52% can be obtained and the luminance is enhanced up to 12,696 cd/m$^2$; and if one film of Example 2 and one brightness enhancement film (PF-96S-188) are additionally used, a luminance gain of 86% can be obtained and the luminance is enhanced up to 15,537 cd/m$^2$. However, a module composed of the backlight source plus two films of Comparative Example 1 can merely provide a luminance gain of 40% and a luminance of 11,694 cd/m$^2$. Furthermore, a module composed of the backlight source plus two films of Comparative Example 2 can merely provide a luminance gain of 42% and a luminance of 11,861 cd/m$^2$. As compared with the module composed of the backlight source plus two films of Comparative Example 1 or 2, the module composed of the backlight source plus two films of Example 2 of the present invention, the module composed of the backlight source plus three films of Example 2 of the present invention and the module composed of the backlight source plus one film of Example 2 of the present invention and one brightness enhancement film can all provide a preferred luminance gain.

In addition, it can be seen from Table 2 that the backlight source plus two films of Example 2, the backlight source plus three films of Example 2, the backlight source plus one film of Example 2 and one brightness enhancement film can significantly improve the luminance, and can maintain the 25-point luminance uniformity at a level of higher than 95%. Moreover, the backlight source plus two films of Example 1, 3, 4 or 5 can also obtain a central luminance of 12,613 cd/m$^2$, 12,695 cd/m$^2$, 12,673 cd/m$^2$ and 12,538 cd/m$^2$, respectively. Therefore, the optical film of the present invention is applicable for the backlight modules of LCDs and liquid crystal TV sets, and can effectively diffuse the light and provide desirable luminance, so that it can be used as a substitute for a conventional design.

What is claimed is:

1. An optical film, comprising a transparent substrate and a resin coating having a convex-concave structure on one surface of the transparent substrate, wherein the resin coating comprises a plurality of organic particles and a binder, the organic particles being formed from a polyacrylate resin comprising at least one mono-functional acrylate monomer and at least one multi-functional acrylate monomer as polymerization units, wherein the multi-functional acrylate monomers are in an amount from about 30 wt % to 70 wt % based on the total weight of the monomers; the organic particles have a single mean particle size; the particle size distribution of the organic particles ranges within about ±5% of the mean particle size; and the organic particles are in an amount from about 180 to about 320 parts by weight per 100 parts by weight of the solids content of the binder.

2. The optical film as claimed in claim 1, wherein the particle size distribution of the organic particles contained in the resin coating ranges within about ±4% of the mean particle size.

3. The optical film as claimed in claim 1, wherein the mean particle size of the organic particles contained in the resin coating is in a range of about 5 μm to about 30 μm.

4. The optical film as claimed in claim 3, wherein the mean particle size of the organic particles contained in the resin coating is in a range of about 10 μm to about 25 μm.

5. The optical film as claimed in claim 1, wherein the organic particles contained in the resin coating are in an amount from about 220 to about 305 parts by weight per 100 parts by weight of the solids content of the binder.

6. The optical film as claimed in claim 1, wherein the coating thickness of the binder contained in the resin coating is approximately from two fifths to three fifths of the particle size of the organic particles.

7. The optical film as claimed in claim 6, wherein the coating thickness of the binder contained in the resin coating is approximately a half of the particle size of the organic particles.

8. The optical film as claimed in claim 1, wherein the organic particles are uniformly distributed in the resin coating in a single layer.

9. The optical film as claimed in claim 1, wherein the mono-functional acrylate monomer is selected from the group consisting of methyl methacrylate (MMA), butyl methacrylate, 2-phenoxy ethyl acrylate, ethoxylated 2-phenoxy ethyl acrylate, 2-(2-ethoxyethoxy)ethyl acrylate, cyclic trimethylolpropane formal acrylate, (3-carboxyethyl acrylate, lauryl methacrylate, isooctyl acrylate, stearyl methacrylate, isodecyl acrylate, isobornyl methacrylate, benzyl acrylate, 2-hydroxyethyl methacrylate phosphate, hydroxyethyl acrylate (HEA), and 2-hydroxyethyl methacrylate (HEMA), and a mixture thereof.

10. The optical film as claimed in claim 1, wherein the multi-functional acrylate monomer is selected from the group consisting of hydroxypivalyl hydroxypivalate diacrylate, ethoxylated 1,6-hexanediol diacrylate, dipropylene glycol diacrylate, tricyclodecane dimethanol diacrylate, ethoxylated dipropylene glycol diacrylate, neopentyl glycol diacrylate, propoxylated neopentyl glycol diacrylate, ethoxylated bisphenol-A dimethacrylate, 2-methyl-1,3-propanediol diacrylate, ethoxylated 2-methyl-1,3-propanediol diacrylate, 2-butyl-2-ethyl-1,3-propanediol diacrylate, ethylene glycol dimethacrylate (EGDMA), diethylene glycol dimethacrylate, tris(2-hydroxy ethyl)isocyanurate triacrylate, pentaerythritol triacrylate, ethoxylated trimethylolpropane triacrylate, propoxylated trimethylolpropane triacrylate, trimethylolpropane trimethacrylate, pentaerythritol tetraacrylate, ethoxylated pentaerythritol tetraacrylate, ditrimethylolpropane tetraacrylate, propoxylated pentaerythritol tetraacrylate, pentaerythritol tetraacrylate, dipentaerythritol hexaacrylate, tripropylene glycol di-methacrylate, 1,4-butanediol dimethacrylate, 1,6-hexanediol dimethacrylate, allylated cyclohexyl dimethacrylate, isocyanurate dimethacrylate, ethoxylated trimethylol propane tri-methacrylate, propoxylated glycerol tri-methacrylate, trimethylol propane tri-methacrylate, and tris(acryloxyethyl) isocyanurate, and a mixture thereof.

11. The optical film as claimed in claim 1, wherein the polyacrylate resin is formed from the monomers containing methyl methacrylate and ethylene glycol dimethacrylate.

12. The optical film as claimed in claim 1, wherein the substrate has an anti-adhesion layer on the other surface opposite to the surface where the resin coating is located thereon, and the anti-adhesion layer comprises a plurality of organic particles and a binder.

13. The optical film as claimed in claim 12, wherein the organic particles contained in the anti-adhesion layer have a mean particle size in the range of about 1 μm to about 10 μm.

14. The optical film as claimed in claim 13, wherein the organic particles contained in the anti-adhesion layer have a particle size distribution ranging within about ±5% of the mean particle size.

15. The optical film as claimed in claim 14, wherein the organic particles contained in the anti-adhesion layer have a particle size distribution ranging within about ±4% of the mean particle size.

16. The optical film as claimed in claim 12, wherein the organic particles contained in the anti-adhesion layer are in an amount from about 0.1 to about 5 parts by weight per 100 parts by weight of the solids content of the binder.

17. The optical film as claimed in claim 12, wherein the anti-adhesion layer has a thickness of about 1 μm to about 10 μm.

18. The optical film as claimed in claim 12, wherein the organic particles contained in the anti-adhesion layer are formed from a polyacrylate resin.

19. The optical film as claimed in claim 18, wherein the polyacrylate resin is formed from the monomers containing methyl methacrylate and ethylene glycol dimethacrylate.

20. The optical film as claimed in claim 19, wherein the ethylene glycol dimethacrylate monomer are in an amount of about 30 wt % to about 70 wt % based on the total weight of the monomers.

21. The optical film as claimed in claim 1, wherein the substrate is selected from the group consisting of a polymethacrylate resin, a polycarbonate resin, a polystyrene resin, a polycycloolefin resin, a polyolefin resin, a polyurethane resin, a triacetate cellulose, a polyimide resin, and a polyester resin, and a mixture thereof.

22. The optical film as claimed in claim 1, wherein the substrate is selected from the group consisting of polyethylene terephthalate, polymethacrylate, polycycloolefin resin, and triacetate cellulose, and a mixture thereof.

23. The optical film as claimed in claim 1, wherein the binder contained in the resin coating or the anti-adhesion layer is selected from the group consisting of a ultraviolet (UV) curing resin, a thermal setting resin, and a thermal plastic resin, and a mixture thereof.

24. The optical film as claimed in claim 23, wherein the binder contained in the resin coating or the anti-adhesion layer comprises a UV curable resin and a resin selected from the group consisting of a thermal setting resin and a thermal plastic resin and a mixture thereof.

25. The optical film as claimed in claim 23, wherein the UV curable resin is formed from at least one acrylic monomer or acrylate monomer having one or more functional groups.

26. The optical film as claimed in claim 25, wherein the acrylate monomer is selected from the group consisting of a methacrylate monomer, an acrylate monomer, a urethane acrylate monomer, a polyester acrylate monomer, and an epoxy acrylate monomer.

27. The optical film as claimed in claim 25, wherein the UV curable resin further comprises an acrylate oligomer.

28. The optical film as claimed in claim 23, wherein the thermal setting resin is selected from the group consisting of a carboxyl (—COOH) and/or hydroxyl (—OH) group-containing polyester resin, epoxy resin, polyacrylate resin, polymethacrylate resin, polyamide resin, fluoro resin, polyimide resin, polyurethane resin, and alkyd resin, and a mixture thereof.

29. The optical film as claimed in claim 23, wherein the thermal plastic resin is selected from the group consisting of a polyester resin and a polymethacrylate resin and a mixture thereof.

30. The optical film as claimed in claim 1, wherein the resin coating and the anti-adhesion layer independently comprise an additive selected from the group consisting of an anti-static agent, a curing agent, a photo initiator, a fluorescent whitening agent, a UV absorber, a leveling agent, a wet agent, a stabilizing agent, a dispersant, and inorganic particulates.

31. The optical film as claimed in claim 30, wherein the anti-static agent is selected from the group consisting of ethoxy glycerin fatty acid esters, quaternary amine compounds, aliphatic amine derivatives, polyethylene oxide, siloxane, and alcohol derivatives.

32. The optical film as claimed in claim 30, wherein the curing agent is diisocyanate or polyisocyanate.

33. The optical film as claimed in claim 1, which is for use as a diffusion film.

34. An optical film, comprising a transparent substrate of polyethylene terephthalate and a resin coating having a convex-concave structure on one surface of the transparent substrate, wherein the resin coating comprises a plurality of organic particles and a binder, the organic particles have a single mean particle size in a range of about 5 μm to about 30 μm; the particle size distribution of the organic particles ranges within about ±5% of the mean particle size; the organic particles are in an amount from about 220 to about 305 parts by weight per 100 parts by weight of the solids content of the binder; the coating thickness of the binder contained in the resin coating is approximately from two fifths to three fifths of the particle size of the organic particles; the organic particles are uniformly distributed in the resin coating in a single layer; and the organic particles being formed from a polyacrylate resin formed from the monomers containing methyl methacrylate and ethylene glycol dimethacrylate, wherein the ethylene glycol dimethacrylate monomer is in an amount from about 30 wt % to 70 wt % based on the total weight of the monomers.

35. The optical film as claimed in claim 34, wherein the mean particle size of the organic particles contained in the resin coating is in a range of about 10 μm to about 25 μm.

36. The optical film as claimed in claim 34, wherein the binder comprises a UV curable resin and a resin selected from the group consisting of a thermal setting resin and a thermal plastic resin and a mixture thereof.

37. The optical film as claimed in claim 34, wherein the coating thickness of the binder contained in the resin coating is approximately a half of the particle size of the organic particles.

* * * * *